United States Patent [19]

Botterman et al.

[11] Patent Number: 5,441,334
[45] Date of Patent: Aug. 15, 1995

[54] CUSTOMIZED VEHICLE WHEEL AND METHOD

[75] Inventors: Ralph C. Botterman, Strongsville; Donald R. Bias; Vincent T. Russell, both of Cleveland, all of Ohio

[73] Assignee: Aluminum Company of America, Pittsburgh, Pa.

[21] Appl. No.: 111,992

[22] Filed: Aug. 25, 1993

[51] Int. Cl.⁶ .............................................. B60B 7/02
[52] U.S. Cl. ................. 301/37.1; 301/37.26; 40/587; 29/453; 29/894.38
[58] Field of Search ................ 301/37.1, 37.26, 37.28, 301/37.31, 37.32, 37.33, 37.35, 63.1, 65, 108.1; 29/160.6, 453, 469.5, 525, 894.38; D12/204, 207, 208, 213; 428/31; 40/587

[56] References Cited

U.S. PATENT DOCUMENTS

| | | |
|---|---|---|
| 292,507 | 10/1887 | Reid . |
| D. 332,441 | 1/1993 | Douglas, Jr. ............... D12/204 |
| 2,392,634 | 1/1946 | Bierman ..................... 40/587 X |
| 3,337,271 | 8/1967 | Lyon .......................... 40/587 X |
| 3,481,652 | 12/1969 | Mazerolle . |
| 4,235,476 | 11/1980 | Arvidsson . |
| 4,316,637 | 2/1982 | Reynolds et al. ............. 301/37.1 |
| 4,317,597 | 3/1982 | Golata et al. . |
| 5,058,959 | 10/1991 | Miles et al. . |
| 5,078,453 | 1/1992 | Siwek . |
| 5,188,429 | 2/1993 | Heck et al. . |

FOREIGN PATENT DOCUMENTS

4125727  2/1993  Germany ..................... 301/37.1

*Primary Examiner*—Russell D. Stormer
*Attorney, Agent, or Firm*—Gary P. Topolosky

[57] ABSTRACT

There is disclosed an improvement to a vehicle wheel having a rim portion onto which a tire is mounted, a disc region having an outer face portion and an inner face portion, and a plurality of lug mounting apertures extending through the disc region. The improvement comprises a plurality of recesses situated within and about a perimeter of the disc region between the rim portion and lug mounting apertures, preferably into the outer face portion of its disc region. A plurality of medallions are sized to fit within these recesses and be secured therein preferably using an adhesive layer. The recesses themselves may be machined, coined, punched, cast or forged into the disc region of a wheel. A method for customizing vehicle wheels to include various symbols or letters is also disclosed.

18 Claims, 4 Drawing Sheets

CUSTOMIZED VEHICLE WHEEL AND METHOD

BACKGROUND OF THE INVENTION

1. Field of the Invention This invention relates to motor vehicle wheels, and more particularly to truck and bus wheels. The invention further relates to means for advertising company names, emblems and/or logos on such wheel products in a practical, yet aesthetically pleasing manner. This invention further relates to means for customizing the same wheel model to display various customer emblems or logos thereon.

2. Technology Review

It is generally known to provide vehicular wheels or hub cap/covers with advertising inserts or model insignias in the central hub region of such wheels or covers. Heck et al. U.S. Pat. No. 5,188,429, for example, shows a fabricated vehicle wheel with a relatively small cap releasably retained by a central aperture extending through the wheel's outer face region. A similar insert is employed by the wheel cover depicted in Arvidsson U.S. Pat. No. 4,235,476. In Mazerolle U.S. Pat. No. 3,481,652, an automobile hub cap is provided with a central flat region onto which advertising stickers are adhered. In a non-vehicular context, Miles et al. U.S. Pat. No. 5,058,959 discloses means for identifying and/or marking the wheels of a suitcase using centrally located, self-adhesive labels.

For many cars and light trucks, there is an established central hub portion on each vehicle wheel. In some configurations, this central hub portion is integrally formed with the wheel's outer face region. Still other wheel configurations employ a separate hub portion for inserting through a central aperture in the wheel's outer face region prior to mounting. This latter system lets wheel manufacturers customize product lines for the various vehicle assemblers to whom they sell by changing central hub portions and any insignias affixed thereto. In this manner, the same basic wheel design can be sold for use on sister models of a Buick, Pontiac, Chevrolet and Oldsmobile, for example. Some manufacturers of original equipment (O.E.M.) or replacement/after-market wheel covers also employ centrally-located cap customizing means.

On the standard wheels of most large rigs, including heavy duty tractors, trailers, load haulers and buses, there is no uniform central hub portion. Such wheels have a larger central aperture than the average car and light truck wheel with many more lug holes located thereabout. This central aperture is sized to fit over and about the larger axle configurations of such heavy duty truck and bus models. Wheel manufacturers would like to sell the same model wheel to multiple customers. Of course, this model would have a number of different lug hole shapes machined into it for mounting system variations and different hand hole shapes for customer variation.

There is nevertheless a need to further customize common wheel models for use by numerous vehicle assemblers/manufacturers. Central hub portions do not exist on heavy duty disc wheels. It would be preferred to customize such wheels, therefore, between the outermost rim and central lug nut region or on the wheel mounting face. It is highly desirable that such customizing not detrimentally affect the wheel's overall performance characteristics, especially those pertaining to total strength, corrosion resistance, maintainability and/or resistance to fatigue cracking. The invention described below satisfies such needs.

SUMMARY OF THE INVENTION

It is a principal objective of this invention to provide an improved vehicle wheel with means for customizing at an aesthetically pleasing, yet practical location on each wheel outer face. It is another objective to provide vehicle wheel customizing means which does not require a central hub portion. It is yet another objective to provide a method for customizing various wheel models for the respective vehicle assemblers to whom such models are sold without detrimentally affecting the wheel's overall strength, resistance to corrosion and/or resistance to fatigue cracking.

It is another principal objective to provide a vehicle wheel customizing system that would allow one wheel type to be used for or sold to multiple customers. Such a system would save on machining set ups and inventory management. It is another objective to provide a wheel customizing system having inlaid medallions which do not deteriorate under normal service conditions, including cleaning and polishing.

These and other objectives/advantages of the present invention are met by an improved vehicle disc wheel having: a rim portion onto which a tire is mounted; the disc region with an outer face portion and an inner face portion; a plurality of lug mounting apertures extending through the mounting face area. The improvement comprises: a plurality of recesses situated within and about the disc region perimeter, preferably in the outer face portion thereof, between the rim portion and lug mounting apertures of the mounting face; a plurality of medallions sized to fit within these recesses; and means for securing the medallions in the disc region recesses. Such recesses may be machined, coined, punched, cast or forged into the disc region of a wheel. There is further disclosed a method for customizing a certain model of vehicle wheel to include the logos, trademarks, etc. of various wheel manufacturers or vehicle assemblies.

BRIEF DESCRIPTION OF THE DRAWINGS

Further features, objectives and advantages of this invention will be made clearer from the following detailed description of preferred embodiments made with reference to the drawings in which.

DETAILED DESCRIPTION OF PREFERRED EMBODIMENTS

Figure 1:
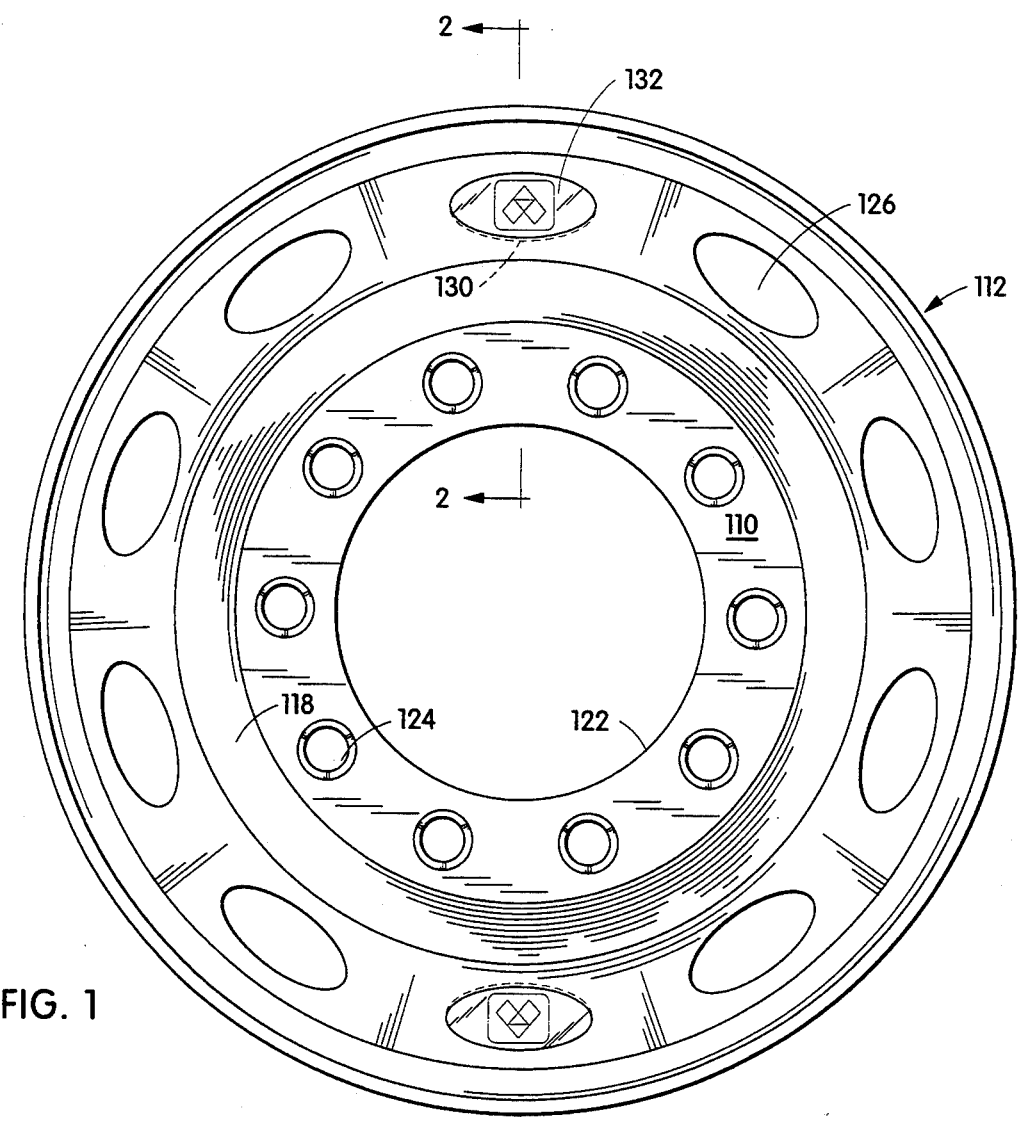
FIG. 1 is a side view, front elevation, of one disc wheel embodiment having advertising medallions inserted into a pair of machined recesses.
Figure 2:
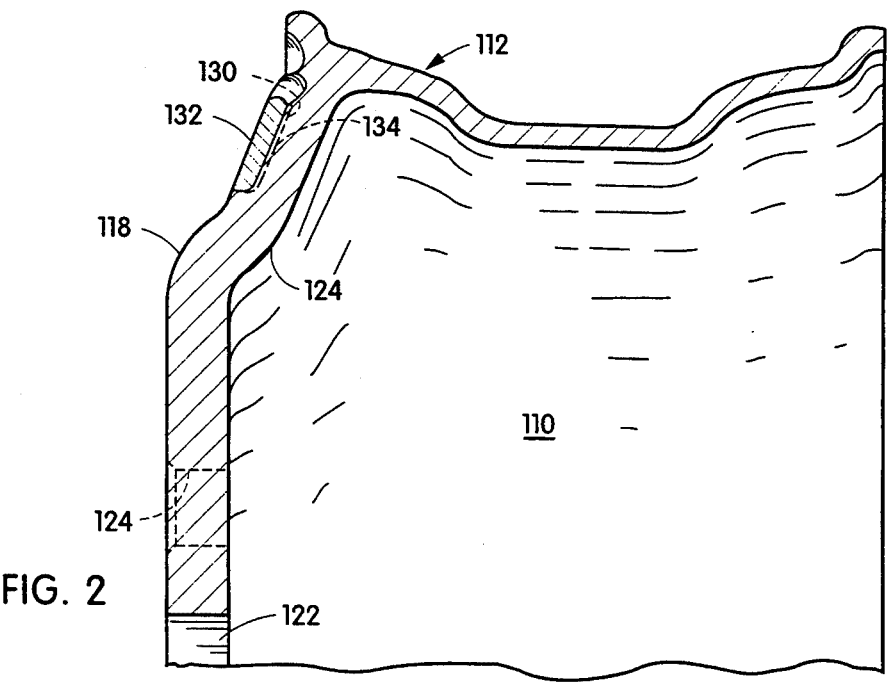
FIG. 2 is a sectional view taken along lines 2—2 of FIG. 1.
Figure 3:
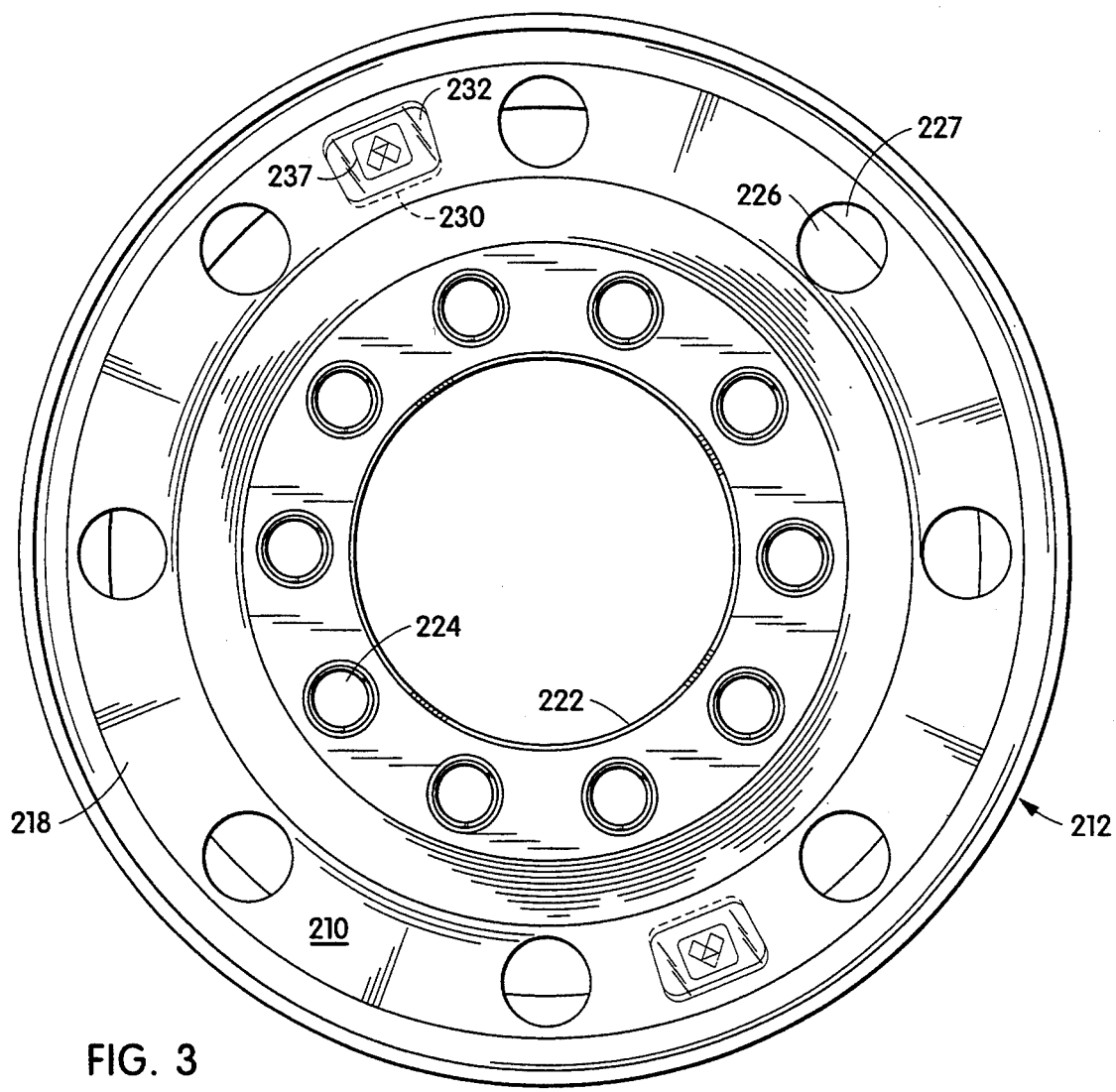
FIG. 3 is a side view, front elevation, of a second wheel embodiment having medallions inserted into recesses machined into opposite sides, 180° apart, of the same outer face portion of a wheel disc region.
Figure 4A:
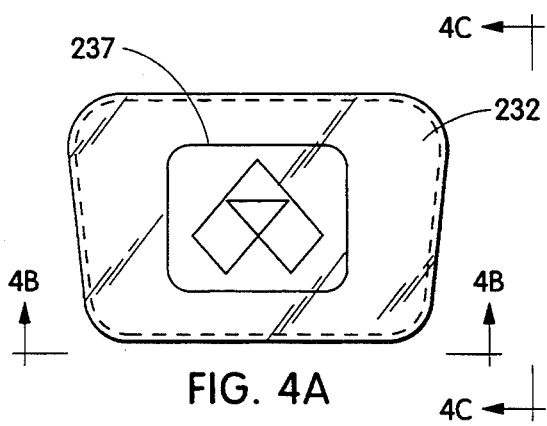
FIGS. 4A through 4C show the front, top and side views, respectively, of the medallion inserted into the wheel recesses of FIG. 3.
Figure 4C:
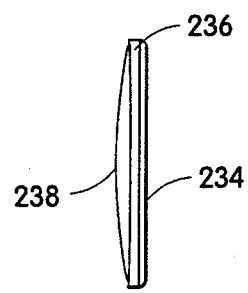
Figure 4B:
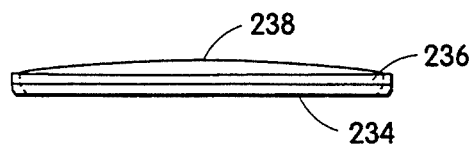

Referring now to FIGS. 1 and 2, there is shown a first embodiment of customized vehicle disc wheel according to the invention. This wheel, generally 110, has a rim portion 112 extending around its perimeter onto which a tire (not shown) is mounted. Generally speaking, each vehicle wheel includes disc and mounting face regions having an outer face portion 118 and inner face portion 120, both of which extend radially inwardly from rim portion 112. In FIGS. 1 and 2, the outer and inner face portions oppose one another. In other wheel configurations, one or more structural members may be extended beyond such inner and outer face portions thereby giving the wheel an H-shaped appearance in cross-section.

In this invention, the disc or mounting face region of the first embodiment includes a plurality of inner and outer curves, together with some substantially planar or bevelled areas. The distance between these inner and outer face portions, or thickness of the overall disc region, is shown in the accompanying drawings as being fairly constant. It is to be understood, however, that non-uniform disc thicknesses may also be customized with various assembler/manufacturer logos pursuant to the present invention.

The typical vehicle wheel includes a plurality of different size and shape apertures through the wheel disc region. There is a large central aperture 122 about which five or more lug mounting apertures 124 are positioned. The total number and relative position of such apertures vary depending on the vehicle axle hardware onto which the wheel is mounted. In the accompanying FIGURES, ten such apertures have conical bevels inward from at least the outer face portion to accommodate the conical inner face to most vehicular lug nuts. This conical bevel aperture 124 is shown by the dotted line silhouette in accompanying FIG. 2. It is to be understood that many vehicle wheels have apertures which bevel conically from both the outer and inner face portions, typically for ease of manufacture. Still other apertures throughout the wheel's outer disc region serve both a utilitarian and stylistic function. For example, apertures 126 though the disc region of this wheel, intermediate rim portion 112 and lug mounting apertures 124, allow vehicle brake parts, either disc or drum, to be air cooled. Depending on their overall size and shape, venting apertures 126 may further serve as "hand holes" to access tire valves and tire valve extenders. Because many different hole shapes accomplish this brake cooling function, the end shape for apertures 126 may vary in style, size, complexity and number. They are also used to impart flair or personality to the different makes and models of numerous vehicle assemblers or wheel manufacturers. Typically, such hand holes, or apertures 126, are machined into a wheel blank after casting, forging or other known manufacturing methods. In other instances, these apertures may be forged, coined, punched or cast into a wheel during its formation.

In the area where wheel venting aperture 126 might otherwise appear, a first embodiment of this invention includes a recess as shown by the dotted line region 130 of FIGS. 1 and 2. This recess is preferably machined into the wheel although, like the venting apertures 126, it may be cast, coined, punched or even forged, in whole or in part, into the disc portion. For most wheel designs, two or more recesses are positioned about the perimeter of the outer face portion so as to maintain the overall balance of the wheel. It is also possible for a single medallion to be sufficiently weighted to compensate for the machining of a single recess into the disc region of a wheel face, though on a less preferred basis. In the first embodiment of this invention, two recesses 130 are positioned at opposite ends of the same wheel face substantially 180° apart. By analogy, if three recesses are desired, they should be positioned about 120° apart. With four recesses, the distance between should be about 90°, and so on. In other instances, the inner face portion may include recesses, one or more especially in those wheel designs having dual sides or an H-shaped cross-section, or other reverse/universal-mounting type applications.

Within recess 130, there is secured an inlaid medallion, insert or other wheel customizing device 132. Preferably, this medallion includes a logo, trademark or other symbol indicative of the vehicle make or model, or wheel manufacturer. The Aluminum Company of America's stylized "A" registered trademark symbol is centered on medallion 132 in FIG. 1 for illustrative purposes. On a preferred basis, recess 130 and medallion 132 are correspondingly sized (in length, width and thickness) so that the outermost medallion surface sits substantially flush with the outer disc face region 118 of wheel 110 after the medallion has been installed therein. It is preferred that each recess and medallion be preferentially shaped to limit their installation in only one (1) direction, i.e., a perfect circle or square-shaped recess would be less desirable since a logo-bearing medallion could be installed therein at a wrong angle or upside-down.

One representative means for securing medallion 132 into its corresponding recess according to the present invention includes an adhesive layer 134 compatible with the material from which the medallion is made, preferably a thermoplastic selected from an acrylic, polycarbonate or the like. The adhesive should also be compatible with the material from which the wheel is made, preferably an aluminum alloy such as 6061-T6, 5454-0 or A356-T6 aluminum (Aluminum Association designations). It is to be understood, however, that still other wheel materials may be used with this invention, such as steel, magnesium and composites. When the wheel body is made from highly reflective material, at least some section of the medallion could be mirror-backed or otherwise reflective. Suitable adhesives tapes include 4262 tape as manufactured by the 3M Company, St. Paul, Minn. Other alternatives to adhesives exist, though on a less preferred basis. For example, medallion 132 could be frictionally secured within recess 130. Medallions can also be made to interlock, snap or screw into a correspondingly-sized disc region recess.

Ideally, the customized wheels of this invention are best suited for heavy duty trucks, tractors, trailers and buses. The same concept could also be employed, however, on aircraft, light truck and/or car wheels. In some instances, it may be desirable to include medallions for customizing wheels with the initials of the vehicle owner/driver. Several embodiments of this invention can accommodate such customizations.

For the other remaining embodiments, similarly functioning wheel parts were correspondingly numbered in the next hundred series. In FIGS. 3 and 4A through 4C, the second vehicle wheel embodiment 210 includes a substantially circularly shaped hand or brake-venting hole 226. An inner section of the wheel's circular rim portion 227 can be seen through and adjacent the outermost periphery of such hand holes. Between two such holes, there is positioned a substantially rectangularly-shaped medallion 232. This medallion, shown in greater detail in FIGS. 4A through 4C, includes an innermost adhesive layer 234 adjacent a reflective layer 236 onto which a registered trademark 237 has been imprinted prior to sealing beneath a clear, outer protective shell 238. It is to be understood that the overall configuration of any respective medallion is not critical to this invention. Other presently existing or subsequently conceived advertising/identification means could also be employed in this capacity. The medallions for securing onto the same wheel model according to this invention need not be uniformly sized and/or shaped. For example, the same wheel could include both oval and capsule shaped recesses. It is only necessary to secure each medallion in its correspondingly sized and shaped recess. As mentioned above, non-regularly shaped recesses are generally preferred for providing positive registry and alignment.

Figure 5:
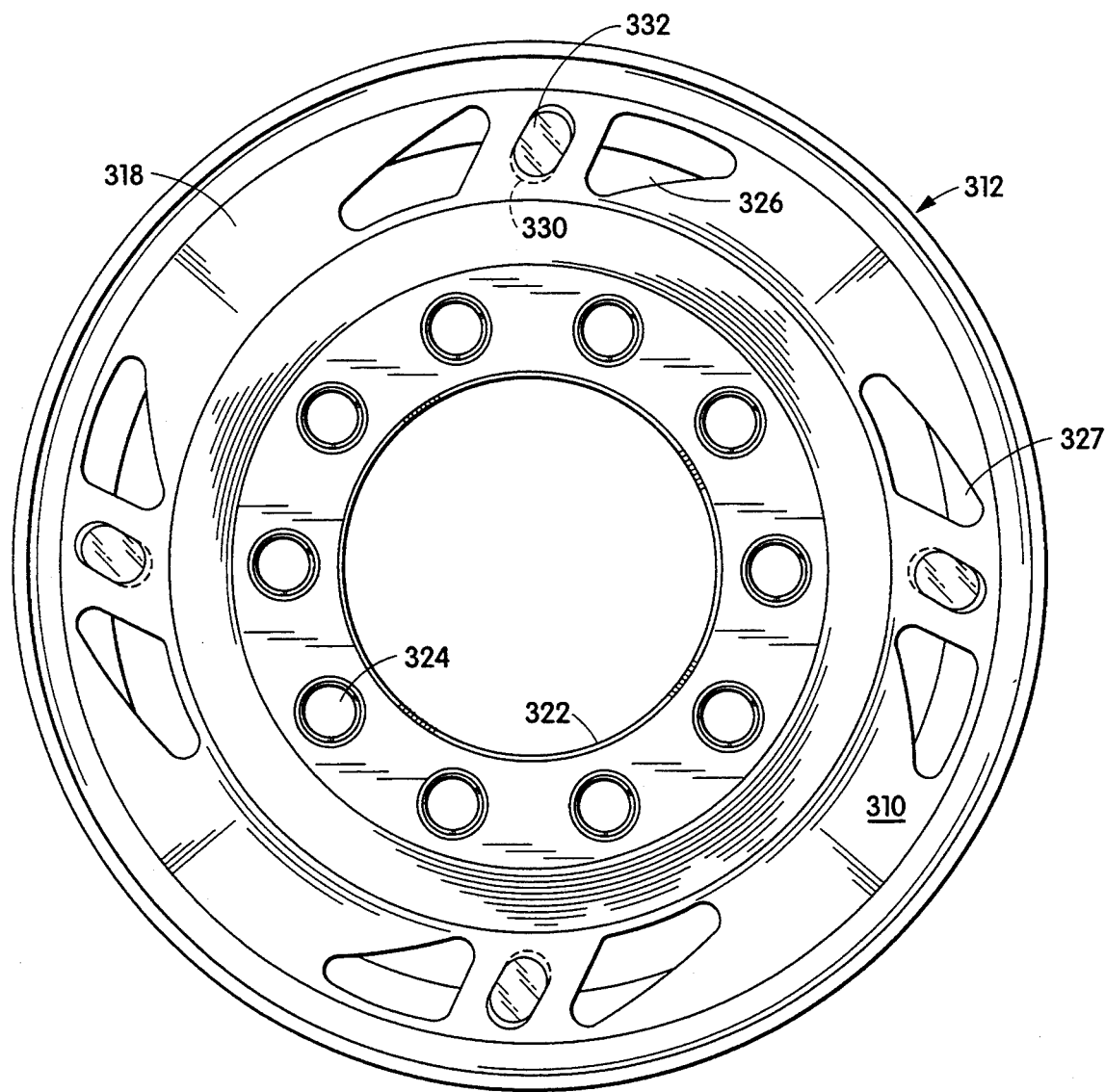
FIG. 5 is a side view of a third wheel embodiment having a plurality of medallions inserted into machined recesses around the wheel's disc region.
Figure 6:
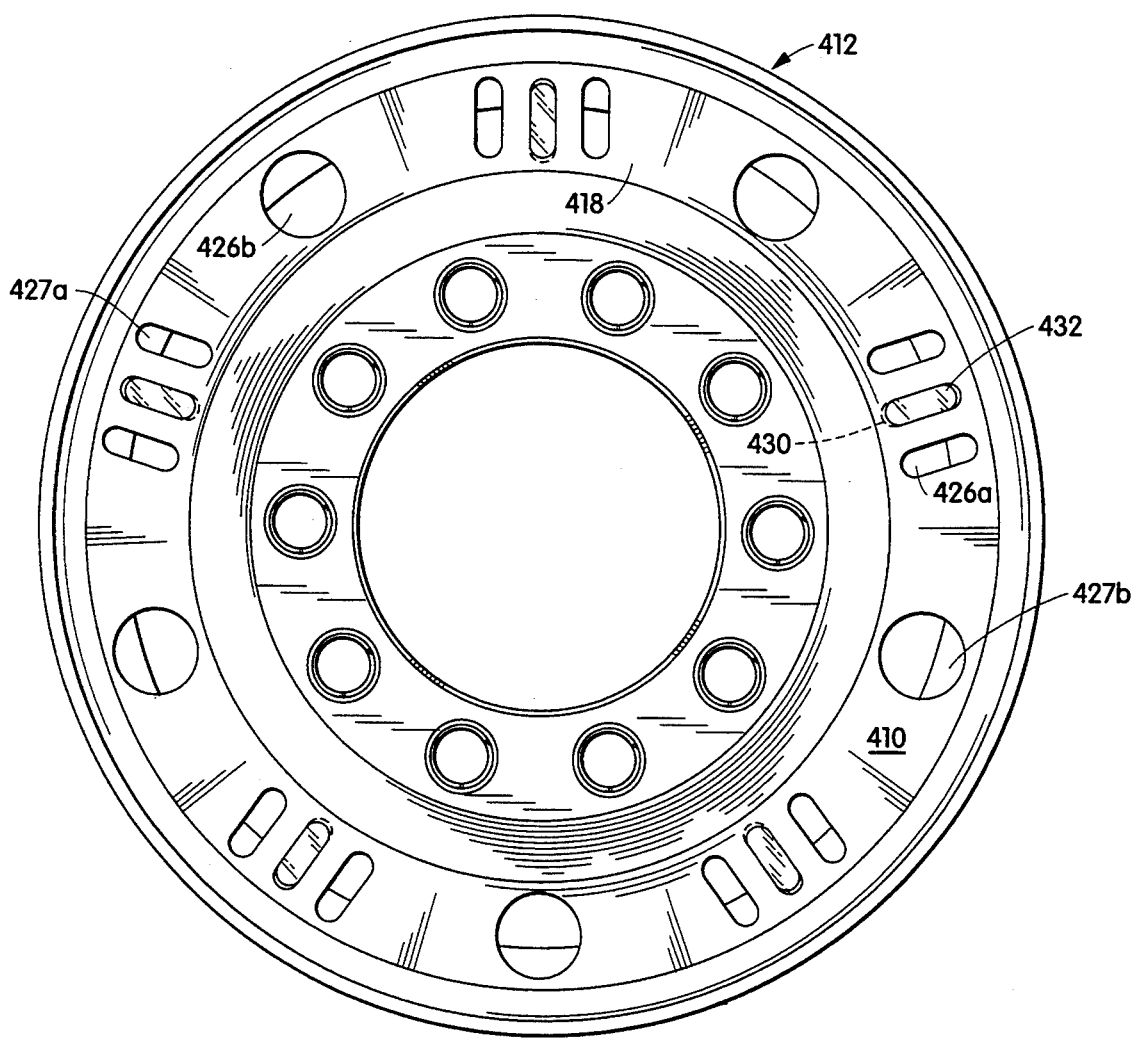
FIG. 6 is a side view Of a fourth wheel embodiment with medallion inserts positioned between similarly sized and shaped brake-venting apertures extending through the wheel's disc region.

The third embodiment, at FIG. 5, includes pairs of substantially triangularly-shaped hand holes 326 with a capsule-like recess 330 and mirrored medallion 332 sandwiched thereby. In this particular configuration, each wheel quadrant has its own hand hole pair/medallion combination. In FIG. 6, the fourth embodiment includes brake venting holes 426a which resemble the medallion insert 432 in both size and shape, i.e., a capsule. Such holes are interspersed between circularly-shaped hand holes 426b. In this manner, the invention illustrates how medallions and recesses can be intermixed to correspond more aesthetically with substantially similarly-shaped wheel hand holes. The foregoing embodiments are merely representative of the numerous shapes, sizes and recess/medallion pairings made possible by the present invention.

In the method of manufacturing customized wheels by this invention, the following steps are practiced: (a) providing the wheel with a plurality of recesses situated within and about a perimeter of the outer face portion of a wheel's disc region, between the rim region and lug mounting apertures thereof; (b) providing a plurality of medallions sized to fit within these disc region recesses; and (c) securing the medallions into the disc region recesses. On a preferred basis, these disc region recesses are machined into the outer face portion of a wheel after being roughed out of said disc region by a forging and turning or wheel casting step. In some instances, especially for first-time applications of a new medallion to a new wheel recess, this method further includes the step of balancing the wheel to compensate for any deviation in medallion weight, most likely after step(c). All such first-time applications would naturally, require the step of choosing a medallion shape and weight that would keep the wheel substantially in balance upon securement within its correspondingly-sized recess.

Having described the presently preferred embodiments, it is to be understood that the invention may be otherwise embodied within the scope of the appended claims.

What is claimed is:

1. In a vehicle disc wheel having a rim portion onto which a tire is mounted, and a disc region with an outer face portion and an inner face portion, said disc region having a plurality of lug mounting apertures extending therethrough, the improvement which comprises:

(a) a plurality of recesses situated within and about a perimeter of the disc region between the rim portion and lug mounting apertures; and (b) a plurality of self-securing medallions sized to fit within the disc region recesses, said medallions including one or more logos indicative of the make or model of said vehicle and each of said medallions being sized and shaped to limit its being secured in only one direction within its corresponding recess.

2. The improvement of claim 1 wherein the vehicle wheel includes two recesses positioned substantially 180° apart about the perimeter of the outer face portion of the disc region.

3. The improvement of claim 1 wherein the recesses are cast, machined, coined, punched or forged into the outer face portion of the disc region.

4. The improvement of claim 1 wherein the recesses are cast, machined, coined, punched or forged into the inner face portion of the disc region.

5. The improvement of claim 1 wherein the recesses and medallions are correspondingly sized such that an outer surface of the medallion is substantially flush with the disc region of the wheel when said medallion is secured into the recess.

6. The improvement of claim 1 wherein the vehicle wheel is made from an aluminum alloy.

7. The improvement of claim 1 wherein the vehicle wheel further includes a large central aperture and a plurality of brake venting apertures with the disc region recesses being positioned between at least two brake venting apertures.

8. The improvement of claim 1 wherein the wheel is suitable for use on a vehicle selected from the group consisting of: a heavy duty truck, tractor, trailer and a bus.

9. An improved truck or bus disc wheel suitable for customizing with one or more logos indicative of said truck or bus, said wheel comprising:

(a) a rim region onto which a tire is mounted;
(b) a disc region having an inner and outer face portion;
(c) a large central aperture;
(d) a plurality of circular apertures situated about the central aperture, each of said circular apertures accommodating at least some portion of a mounting lug extended therethrough;
(e) a plurality of brake venting apertures about the perimeter of the disc region;
(f) a plurality of recesses situated within and about a perimeter of the disc region between the rim region and plurality of circular apertures; and
(g) a plurality of self-securing medallions sized to fit within the recesses in the disc region, each of said medallions being sized and shaped to limit its being secured in only one direction within its corresponding recess.

10. The truck or bus wheel of claim 9 wherein the recesses are machined, cast or forged into the outer face portion of the disc region.

11. The truck or bus wheel of claim 9 wherein the recesses are machined, cast or forged into the inner face portion of the disc region.

12. The truck or bus wheel of claim 9 wherein the recesses and medallions are correspondingly sized so that an outer surface of the medallion is substantially flush with the disc region when said medallions are secured in the recess.

13. The truck or bus wheel of claim 9 wherein the wheel material consists essentially of an aluminum alloy.

14. A method for customizing a vehicle wheel model to include one or more symbols indicative of the make or model of said vehicle, said wheel including a rim portion onto which a tire is mounted, and a disc region having an outer face and inner face portion and a plurality of lug mounting apertures, said method comprising:
   (a) providing the wheel with a plurality of non-circular recesses situated within and about a perimeter of the disc region between the rim portion and plurality of lug mounting apertures;
   (b) providing a plurality of non-circular medallions, each medallion sized and shaped to fit and be secured in only one direction within the corresponding recesses of the disc region; and
   (c) securing the medallions into the disc region recesses.

15. The method of claim 14 wherein step (a) includes machining the recess into the outer face portion of the disc region.

16. The method of claim 14 wherein step (a) includes casting the recess into the outer face portion of the disc region.

17. The method of claim 14 wherein step (a) includes forging the recess into the outer face portion of the disc region.

18. The method of claim 14 which further includes:
   (a) balancing the wheel after the medallion has been secured in the disc region recess.

* * * * *